Aug. 9, 1955  L. E. JASPER  2,714,826
SELF-PROPELLED VEHICLE TRANSMISSION
Filed Aug. 15, 1949  3 Sheets-Sheet 1
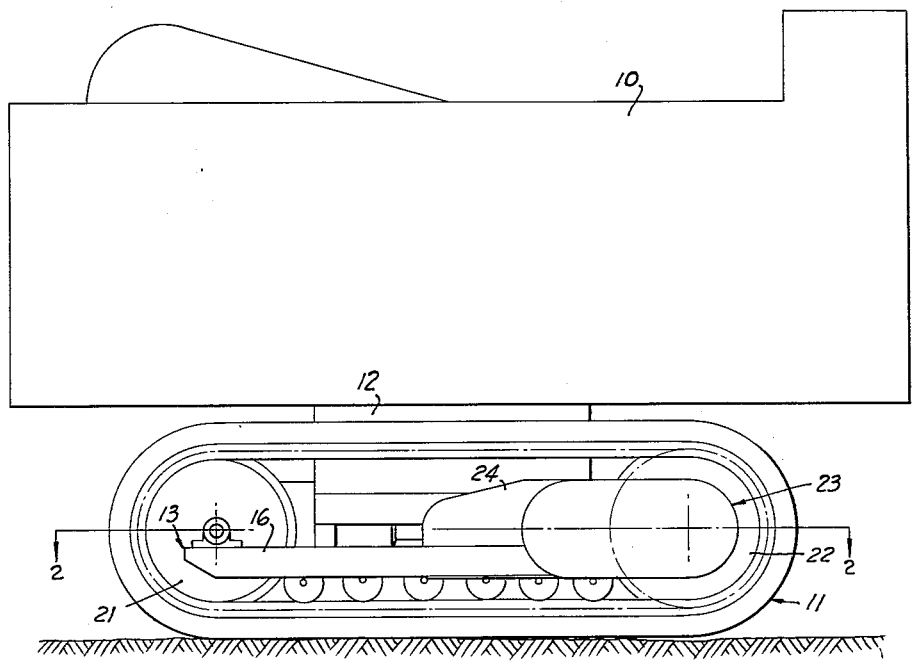
FIG_1_
FIG_4_
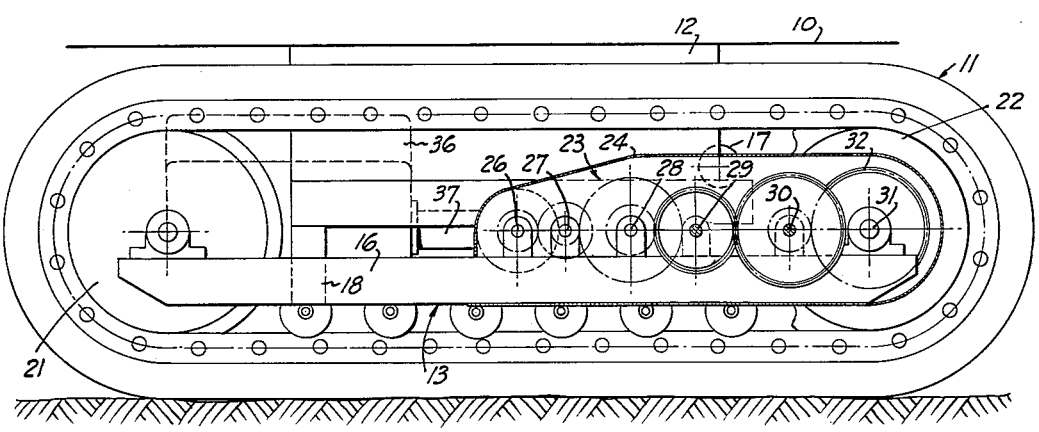
INVENTOR
Lenus E. Jasper
BY
ATTORNEYS

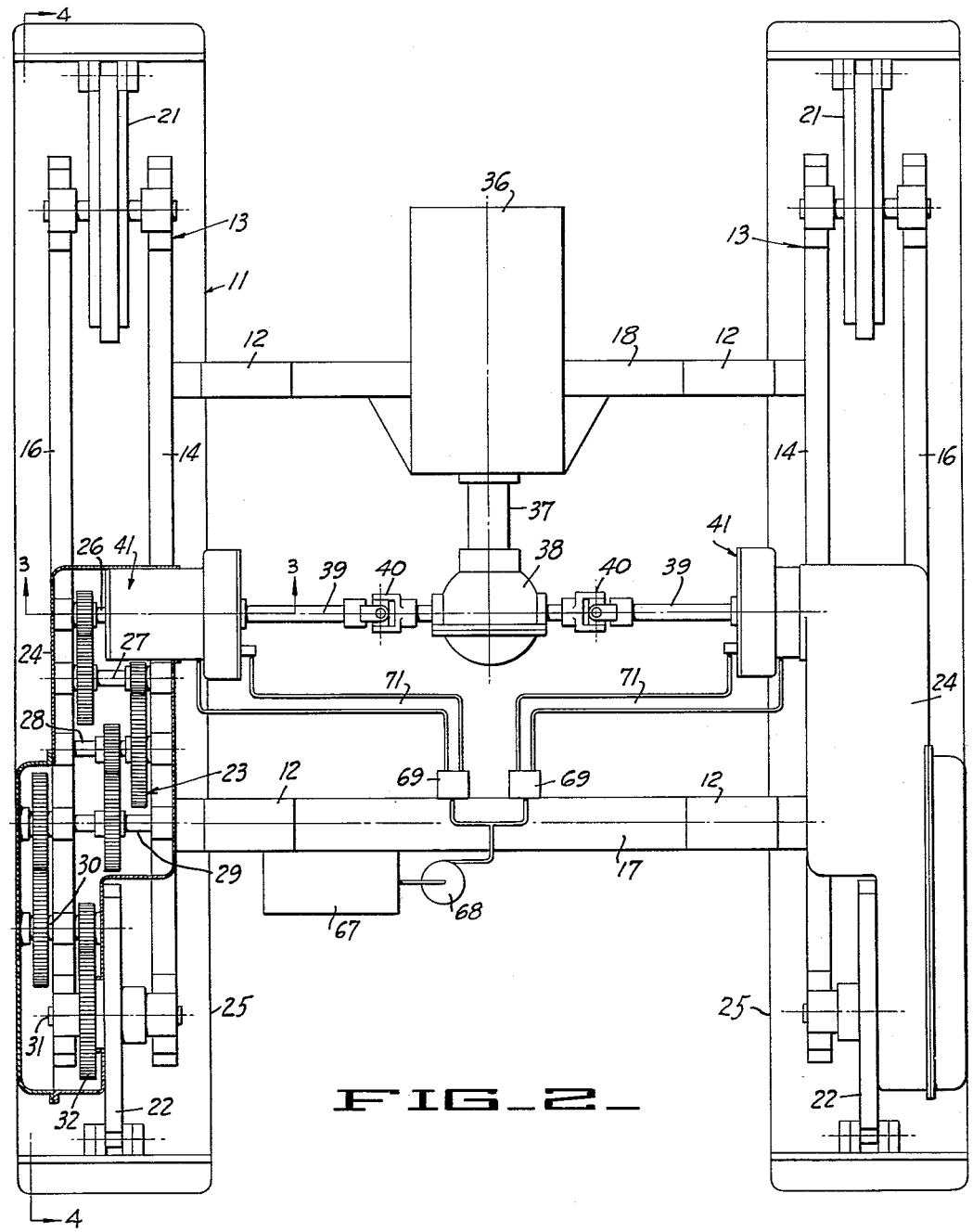

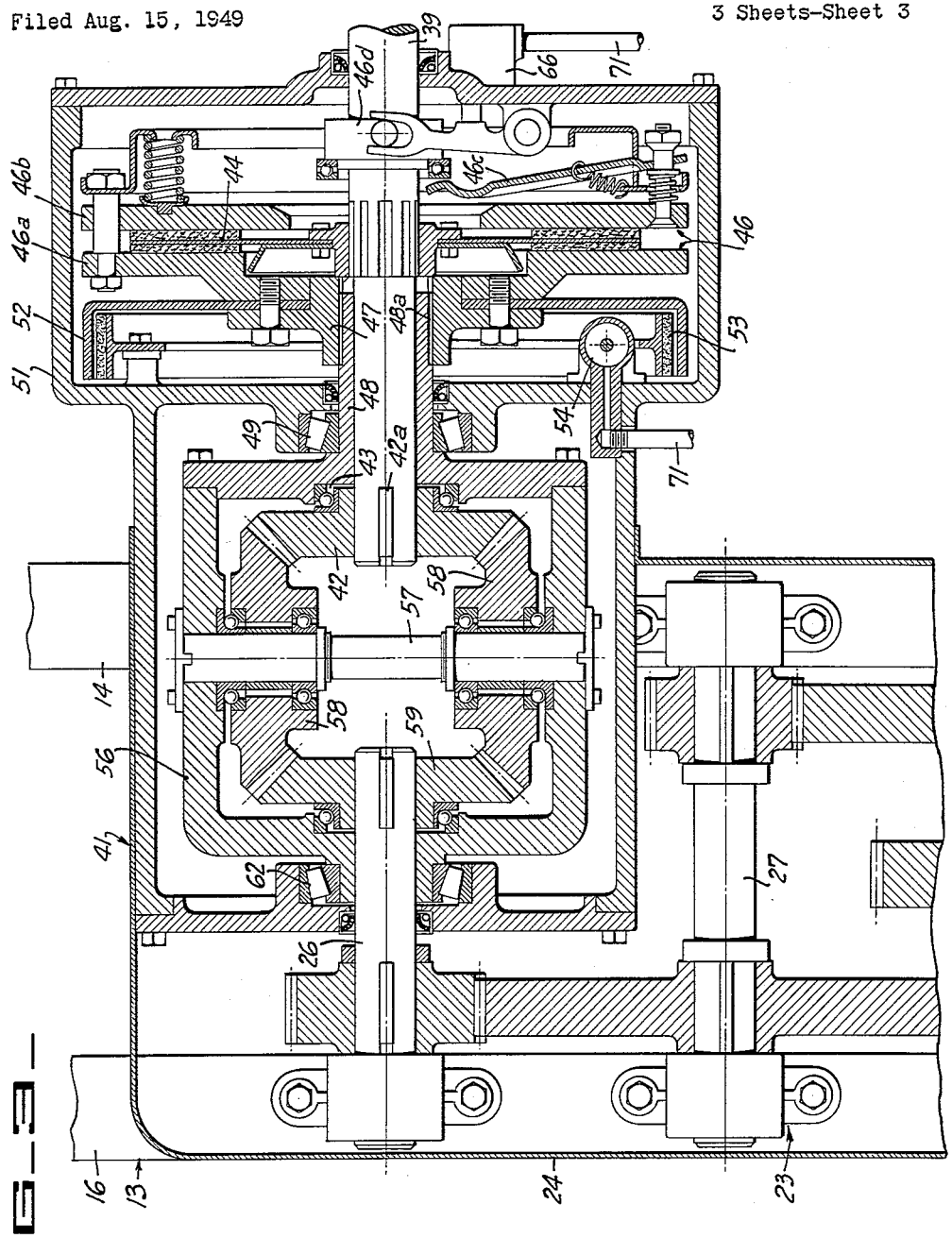

United States Patent Office 2,714,826
Patented Aug. 9, 1955

2,714,826

SELF-PROPELLED VEHICLE TRANSMISSION

Lenus E. Jasper, Orland, Calif.

Application August 15, 1949, Serial No. 110,410

1 Claim. (Cl. 74—780)

This invention relates to self-propelled vehicles and particularly to self-propelled vehicles of the self-laying track type.

There have in the past been many types of self-propelled, self-laying track type vehicles which have been adapted to be used for certain specific purposes. Among these purposes has been their adaptation for use in mud, water, etc., and I have particular reference to devices of this character which are adapted to be used in rice fields and flooded areas where traction at times is difficult if not impossible.

Although devices of this character have been used in the past and have been in some respects successful, nevertheless all of the difficulties inherent in them have not been overcome and it is an object of this invention to overcome what appears to be a major defect inherent in track-type vehicles and that is, lack of maneuverability.

It is an object of this invention to provide a device of this character which is maneuverable under substantially all conditions.

A further object of this invention is to provide a device of the character described which may be said to be able to turn upon itself, so to speak, by providing a device one of whose tracks may be driven forwardly and whose other track may simultaneously be driven in a reverse direction whereupon the device is adapted to turn about its own vertical axis.

It is a further object of this invention to provide a device of this character in which a substantial portion of the power transmitting mechanism is mounted upon the track frames and is sealed with respect to dust, dirt and moisture.

Other objects and advantages of the present invention will appear from the following specification taken in conjunction with the accompanying drawings in which:

Figure 1 illustrates the adaptation of my invention to a rice harvesting device.

Figure 2 is a cross-sectional detail taken along the line 2—2 of Figure 1.

Figure 3 is a cross-sectional detail taken along the line 3—3 of Figure 2.

Figure 4 is a cross-sectional detail taken along the line 4—4 of Figure 2.

As is shown in Figure 1 this device is particularly adapted for use in connection with a rice harvesting machine although it should be clearly understood at the outset that this invention is not limited to this use. In fact this invention is not limited to use with a particular type of harvesting device, wagon, vehicle, or other implement, its limitations being only those of size, construction, and adaptability to a particular vehicle for a particular use.

As shown in Figure 1 however the device 10 illustrates a rice harvesting machine which is mounted upon a suitable framework 11 in any suitable manner as, for example, by means of members 12.

The self-propelled unit 11 consists generally, as shown in Figure 2, of suitable track frames 13, each of which consists of two pairs of side rails 14 and 16 respectively which are secured together at one end, as shown in Figure 2, by a tubular member 17 with respect to which both the frames 13 are adapted to pivot. The universal mounting of the member 17 with respect to the frames 13 is substantially conventional. At their forward ends the frames 13 are connected by a transverse member 18 and are likewise secured thereto in a conventional manner.

As is particularly shown in Figures 2 and 4, the frames 13 and side rails 14 and 16 are adapted to provide support for a pair of sprockets 21 and 22 about which are threaded a pair of endless tracks 25 which are to be driven thereby. Since the frames 13 and the members mounted thereon are identical, I will describe in detail only one of said units.

The member 13, for example, is adapted to house one of two identical gear reduction units 23 which, it will be observed at the outset, are entirely enclosed by a suitable moistureproof and weatherproof housing 24 which, as shown herein, is preferably cast and is provided with suitable strengthened portions within which bearings may be mounted and shafts may be journaled.

As shown in Figure 2, for example, the housing 24 provides a substantially sealed chamber for a number of transverse shafts as, for example, the shafts 26, 27, 28, 29, 30 and 31. Each of these shafts except 26 and 31 is provided with a pair of gears which, as shown in Figure 2, provide a gear reduction train and a drive from shaft 26 through shaft 31 and gear 32 and transmits power to sprockets 22.

The use of the sealed chamber 24 is especially important where this device is to be used in wet or moist places where the moisture or dampness would ordinarily result in corrosion. In addition the device is peculiarly adapted to be used on dry dusty jobs where the abrasive character of dust or sand would quickly take its toll of the gears and bearings if the same were exposed thereto.

Power for my device is provided by a suitable motor 36 which, through a suitable shaft 37 and direct drive assembly 38, drives a pair of shafts 39. The shafts 39 may be provided with suitable universal joints 40 as shown and as dictated by the character, size and peculiar construction of each device.

The identical gear boxes 41 which are likewise mounted upon the frames 13 are more fully illustrated in Figure 3. As is illustrated in Figure 3 the drive shafts 39 are provided with a bevel gear 42 which is keyed thereto as by means of a key 42a. At this point it should be explained that the drive shaft 39 and the bevel gear 42 are constantly rotating in suitable bearings 43.

Likewise mounted upon the drive shaft 39 I have provided a friction clutch member which consists generally of a driving member 44 which is suitably splined for longitudinal motion upon and along the shaft 39 and a driven member 46. The driven member 46, consisting of two plates 46a and 46b, is suitably connected as shown and is suitably mounted upon a hub 47 which is rotatably and coaxially mounted on the shaft 39. The hub 47 is suitably keyed at 48a to an extending sleeve 48 which is rotatably mounted both with respect to the shaft 39 and the housing 51 by means of the bearing 49 in housing 51. Likewise secured to the hub 47 and the driven member 46a there is provided a brake drum 52 which, together with the members 46a and 46b, the hub 47 and the sleeve 48, forms in effect a single unit which is rotatably mounted both with respect to the drive shaft 39 and the housing 51 and is coaxially mounted with respect to the shaft 39. It will be appreciated that suitable bushings and bearings may be inserted wherever mechanical expediency dictates and, it is, of course, to be assumed that proper engineering principles will be adhered to in the design and construction of this device.

The driving clutch member 44 is splined upon the shaft 39 and is adapted to move longitudinally along said shaft. The driven members 46a and 46b form a substantially conventional clutch member 46 and are actuated as by means of a suitable lever 46c which in turn is actuated by movement of the collar 46d, also mounted upon the driving shaft 39. The collar 46d is moved along the shaft 39 and caused to operate the lever 46c in response to certain hydraulic controls which will more fully hereinafter be explained. However, movement of the collar 46d to the right as shown in Figure 3 actuates the lever 46c to urge the members 46a and 46b into engagement with the clutch member 44 thereby driving the entire assembly comprising drum 52, hub 47 and sleeve 48. Movement of the member 46d to the left as shown in Figure 3 allows the members 46a and 46b to be separated whereupon the driving member 44 is disengaged therefrom and the above identified assembly is not caused to be driven.

Also mounted within the brake drum 52 and suitably secured to the housing 51 there is a pair of brake shoes 53 which are adapted to be actuated by a hydraulic actuating member 54.

Rigidly connected to and, in fact comprising a portion of the sleeve 48, is a cage 56 which as shown is provided with a shaft 57 upon which there is mounted a pair of planetary gears 58 which, in turn, mesh with gear 42 and a gear 59. Gear 59 is mounted upon the driven shaft 26. The driven shaft 26 is rotatably mounted with respect to the housing 51 as by means of suitable bearing 62.

Operation of this portion of the device may briefly be described as follows: It will be borne in mind that the driving shaft 39 and the gear 42 are constantly rotating. It must be borne in mind at all times that the gears 42, 58 and 59 form a planetary unit, and that when the cage 56 is driven at the same speed as the gear 42, the gears 42, 58 and 59 do not rotate with respect to each other but as a unit with cage 56, and that the driving shaft 39, through this assembly, drives shaft 26 in the same direction and at the same speed. However, as is obvious to those familiar with planetary gear systems and their construction and operation, when the cage 56 is not allowed to rotate, the gear 42 causes the gears 58 to be rotated about their own axes and the axis of the shaft 47, thereby imparting a reverse motion to the gear 59 and to the driven shaft 26. It will be appreciated that the speed of rotation in a reverse direction will depend upon the ratio of the gears 42, 58 and 59. By varying the ratio of these gears the device may be caused to operate at either full speed, half speed, quarter speed, or any intermediate speed in a reverse direction. The means for determining the rotation or nonrotation of the cage 56 may be described as follows: It will be recalled that the cage 56 and sleeve 48, together with the hub 47 and the drum 52, form one unit. When, therefore, the drum 52 is prevented from rotating by the action of the brake shoes 53, the cage 56 is likewise prevented from rotating, whereupon the shaft 26 is driven in a direction reverse to the direction of rotation of the driving shaft 39.

When, however, by suitable operation of the hydraulic element 54, the brake shoes 53 are retracted and the drum 52 is free to rotate with respect thereto, and the clutch member 44 is brought into engagement with the clutch members 46, the entire unit is driven by the shaft 39. This results in similar rotation of the hub 47, sleeve 48 and the cage 56. As has previously been explained, rotation of the cage 56 at the same speed as the driving shaft 39, imparts a similar rotation to the driven shaft 26.

In addition to the forward and reverse operations above described there is, of course, a neutral position which is accomplished when the driving member 44 and the driven members 46a and 46b are disengaged and the brake shoes 53 and the brake drum 52 are disengaged. When this situation exists, rotation of the shaft 39 is imparted to the driving member 44 and to the gear 42. The rotary motion of the member 44 is not imparted to the driven members 46a and 46b. However, rotation of the gear 42 is transmitted to the gears 58. Ordinarily this would result in rotation of the shaft 26, however, rotation of the shaft 26 is resisted by inertia and this motion is instead imparted to the cage 56 causing cage 56 to rotate about the shaft 26 and the shaft 39. Rotation of the cage 56 is not restrained since, it will be recalled, the brake shoes 53 and the brake drum 52 are not in engagement.

When the device is operating in neutral position as previously described it may be shifted to forward or reverse position by the actuation of suitable control means whereby the member 44 and the members 46a and 46b are brought into engagement or the members 53 and 52 are brought into engagement as has previously been described herein.

As is shown in Figure 3, the clutch members 46 and the brake shoes 53 are adapted to be actuated by a pair of hydraulic elements 66 and 54 respectively.

The hydraulic elements 66 and 54 consist of conventional hydraulic cylinders and pistons adapted to be connected to a source of fluid under pressure whereby, when fluid is introduced into element 66, for example, the clutch plates 46 engage clutch member 44. Also, when fluid is allowed to bleed out of element 66, the clutch members 44 and 46 are disengaged. Similar operation of hydraulic member 54 results in engagement or disengagement of brake shoes 53 and brake drum 52 upon application to or bleeding of fluid from the member 54. The source of fluid under pressure consists of a tank 67, pump 68, valve members 69 and suitable piping and connections 71. The valves 69 are of a particular type. As shown, hydraulic elements 66 and 54 for each of the forward-reverse mechanisms are actuated by one valve 69. These valves are constructed in such a manner that when fluid under pressure is being introduced into member 66, the member 54 is vented and there is no fluid under pressure therein. Also when fluid under pressure is introduced into member 54 the member 66 is vented and there is no fluid under pressure therein. When either of the members 66 or 54 is vented, the members 44 or 52 which they actuate, are returned from operating position to neutral position. It will be seen therefore that by operation of the valves 69 the device may be made to advance, reverse, turn or remain stationary. Advance is accomplished by actuation of both valves 69 whereby both members 66 are actuated and members 54 are vented. This, it will be recalled, causes simultaneous and similar rotation of members 39 and 26. Reverse is accomplished by actuating both valves 69 whereby members 54 are actuated and members 66 are vented. This causes counterrotation of members 39 and 26. Turning is accomplished by actuating one valve 69 to actuate one member 66 and vent its corresponding member 54, and at the same time by actuating the other valve 69 to actuate the other member 54 and vent its corresponding member 66. This results in one tread 23 advancing as the other reverses, thereby turning the device. Stationary position is maintained by actuating the valves 69 whereby the members 44 and 46 are not in engagement and the members 52 and 53 are out of engagement.

Operation of the entire apparatus may briefly be described as follows: The motor 36 is started and rotary motion is imparted to shafts 39 which are adapted to drive similar assemblies 23. By the proper operation of hydraulic valves 69 the operator may cause the members 44 and 46 to engage, and the members 52 and 53 to be disengaged or, he may cause the engagement of the members 52 and 53 and the disengagement of the members 44 and 46. In the event the operator elects to engage the members 44 and 46 and to disengage the members 52 and 53, the driving shaft 39, the clutch assembly 44-46, hub 47, cage 56 and driven shaft 26 will rotate as one, with the result that forward motion will be imparted to the driven shaft 26 and ultimately through the assembly 23 to the driving sprocket 22 on each of the track frames 13 with the result that the vehicle will advance in a forward direction. However, when the operator desires to cause the device to turn either to the right or to the left he may, by suitable operation of the valves 69, cause either one of the tracks 23 to continue in the same direction and yet cause the other track 23 to halt and operate in a reverse direction. This is accomplished by disengaging the clutch elements 44 and 46 and causing the engagement of the brake shoes 53 with the brake drum 52 whereupon the drive shaft 39 and gear 42, although they continue to operate in the same direction, do not cause simultaneous and similar rotation of the cage 56. On the contrary, the members 52, 46, 47, 48 and 56 are prevented from rotating whereby the gears 58 provide a planetary effect and cause counterrotation of the gear 59 and the driven shaft 26. This reverse rotation of the driven shaft 26 is transmitted through the gear train to the track 23 whereupon the same reverses its direction causing that side of the vehicle to reverse as the other side of the vehicle advances. This results in rotation of the device about its vertical axis.

I claim:

A power transmission assembly, said assembly being adapted for use with a tractor of the track laying type for use in rice fields wherein the tractor has a motor mounted between the tracks serving to drive the tracks through a gear assembly disposed to the rear of the motor and through drive shafts extending laterally of the tracks from the gear assembly, each track having a gear train associated with the same adapted to be driven by the corresponding drive shaft; said power transmission assembly comprising a stationary enclosed housing, a driven shaft journalled in one end of said housing and adapted to be connected to said gear train, a driving shaft journalled in the other end of said housing and adapted to be connected to said drive shaft, a rotatable cage journalled within said stationary housing and having said driving shaft and said driven shaft journalled in the opposite ends thereof, planetary gearing mounted within said rotatable cage and connected to said driving and driven shafts, a sleeve extending from said rotatable cage and journalled on said driving shaft, a hub fixed on said sleeve, a brake mechanism in said stationary housing operable to cause said driven shaft to be driven in a reverse direction with respect to said driving shaft, said brake mechanism comprising a brake drum fixed to said hub, an expansible brake shoe attached to said stationary housing and disposed within said drum and adapted to engage said drum, a clutch mechanism in said stationary housing operable to cause said driven shaft to be driven in the same direction as said driving shaft, said clutch mechanism comprising a driving clutch member splined to said driving shaft, a pair of opposed clutch faces fixed to said driving clutch member, a first driven clutch member attached to said hub and adapted to engage one of said faces, said hub serving as a common mounting for said brake drum and said first driven clutch member, a second driven clutch member adapted to engage the other of said faces, means for attaching said second driven clutch member to said first driven clutch member to prevent rotational movement of said second driven clutch member with respect to said first driven clutch member, and to permit longitudinal movement of said second driven clutch member axially of the driving shaft to cause said first and second driven clutch members to engage said driving clutch member, an actuator connected to said brake mechanism for operating the same, and a second actuator connected to said clutch mechanism for actuating the same.

References Cited in the file of this patent

UNITED STATES PATENTS

| | | |
|---|---|---|
| 1,149,160 | Johnson | Aug. 3, 1915 |
| 1,292,607 | Huffman | Jan. 28, 1919 |
| 1,505,371 | Butler | Aug. 19, 1924 |
| 1,620,668 | Lipps | Mar. 15, 1927 |
| 1,653,262 | Dickson | Dec. 20, 1927 |
| 1,804,668 | Bolgiano | May 12, 1931 |
| 1,891,182 | Ross | Dec. 13, 1932 |
| 2,018,014 | Fahrney | Oct. 22, 1935 |
| 2,025,854 | Freeman | Dec. 31, 1935 |
| 2,072,174 | Marshall | Mar. 2, 1937 |
| 2,361,357 | Schmitter | Oct. 24, 1944 |
| 2,374,240 | Shankman | Apr. 24, 1945 |
| 2,406,230 | Lill | Aug. 20, 1946 |
| 2,547,038 | Parrish | Apr. 3, 1951 |
| 2,633,034 | Mathers | Mar. 31, 1953 |

FOREIGN PATENTS

| | | |
|---|---|---|
| 798,953 | France | Mar. 14, 1936 |